US010199958B2

(12) United States Patent
Shin et al.

(10) Patent No.: US 10,199,958 B2
(45) Date of Patent: Feb. 5, 2019

(54) TRIBOELECTRIC GENERATOR

(71) Applicant: Samsung Electronics Co., Ltd., Suwon-si, Gyeonggi-do (KR)

(72) Inventors: Hyeonjin Shin, Suwon-si (KR); Kyungeun Byun, Seongnam-si (KR); Minsu Seol, Suwon-si (KR); Seongjun Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 289 days.

(21) Appl. No.: 15/049,726

(22) Filed: Feb. 22, 2016

(65) Prior Publication Data

US 2016/0315561 A1    Oct. 27, 2016

(30) Foreign Application Priority Data

Apr. 21, 2015  (KR) .................. 10-2015-0056003
Oct. 1, 2015   (KR) .................. 10-2015-0138615

(51) Int. Cl.
*H02N 1/04* (2006.01)
*H02N 1/00* (2006.01)

(52) U.S. Cl.
CPC .................... *H02N 1/04* (2013.01)

(58) Field of Classification Search
CPC . H02N 1/04; H02N 1/00; H01L 51/52; H05B 33/04
See application file for complete search history.

(56) References Cited

U.S. PATENT DOCUMENTS

| 8,803,406 | B2 | 8/2014 | Lee et al. |
| 9,329,718 | B2 | 5/2016 | Kim |
| 9,790,928 | B2 * | 10/2017 | Wang ................ F03G 5/06 |
| 2009/0146111 | A1 | 6/2009 | Shin et al. |
| 2010/0133480 | A1 | 6/2010 | Shin et al. |
| 2010/0140561 | A1 | 6/2010 | Choi et al. |
| 2013/0049531 | A1 | 2/2013 | Wang et al. |
| 2014/0246950 | A1 | 9/2014 | Wang et al. |
| 2014/0246951 | A1 | 9/2014 | Wang et al. |
| 2014/0292138 | A1 | 10/2014 | Wang et al. |
| 2014/0300248 | A1 | 10/2014 | Wang et al. |
| 2014/0313141 | A1 | 10/2014 | Park et al. |
| 2015/0061460 | A1 | 3/2015 | Bae et al. |

(Continued)

FOREIGN PATENT DOCUMENTS

| CN | 104242723 A | 12/2014 |
| CN | 104300828 A | 1/2015 |

(Continued)

OTHER PUBLICATIONS

European Search Report dated Feb. 24, 2017 for corresponding European Patent Application No. 16163889.5.

(Continued)

*Primary Examiner* — Edgardo San Martin
(74) *Attorney, Agent, or Firm* — Harness, Dickey & Pierce, P.L.C.

(57) ABSTRACT

A triboelectric generator includes first and second electrodes facing each other, and a first energy generation layer provided on the first electrode and generating electric energy through contact with other material, the first energy generation layer comprising a two-dimensional (2D) material having a crystal structure of a 2D shape.

39 Claims, 16 Drawing Sheets

(56) References Cited

U.S. PATENT DOCUMENTS

| | | | |
|---|---|---|---|
| 2016/0315561 A1* | 10/2016 | Shin | H02N 1/04 |
| 2016/0336505 A1* | 11/2016 | Arizumi | H01L 41/113 |
| 2016/0359429 A1* | 12/2016 | Byun | H02N 1/04 |
| 2017/0170749 A1* | 6/2017 | Arizumi | H02N 1/04 |
| 2017/0331396 A1* | 11/2017 | Byun | H02N 1/04 |
| 2017/0331397 A1* | 11/2017 | Kim | H02N 1/04 |
| 2018/0062543 A1* | 3/2018 | Jung | H02N 1/04 |

FOREIGN PATENT DOCUMENTS

| | | |
|---|---|---|
| KR | 2009-0059871 A | 6/2009 |
| KR | 2009-0126959 A | 12/2009 |
| KR | 2010-0061088 A | 6/2010 |
| KR | 2014-0101062 A | 8/2014 |
| KR | 2014-0126607 A | 10/2014 |
| KR | 2014-0141171 A | 12/2014 |

OTHER PUBLICATIONS

Wang, Zhong Lin, et al., "Triboelectric Nanogenerators as New Energy Technology for Self-Powered Systems and as Active Mechanical and Chemical Sensors," ACS NANO, vol. 7, No. 11, pp. 9533-9557, 2013.

Han, Sang A., et al., "Hexagonal boron nitride assisted growth of stoichiometric $Al_2O_3$ dielectric on graphene for triboelectric nanogenerators," Nano Energy, vol. 12, 2015, pp. 556-566.

Han, Sang A., et al., "Supporting Information—Hexagonal boron nitride assisted growth of Stoichiometric $Al_2O_3$ dielectric on graphene for triboelectric nanogenerators," 2015, pp. 1-7; XP055312754; URL: http://www.sciencedirect.com/science/MiamiMultiMediaURL/1-s2.0-S2211285515000300/1-s2.0-S2211285515000300-mmc1.doc/280655/html/S2211285515000300/92694bedfd5c18d0483f11e207a87647/mmc1.doc.

Yazyev, Oleg V., "Polycrystalline graphene and other two-dimensional materials," Nature Nanotechnology, vol. 9, Oct. 2014, pp. 755-767.

European Search Report dated Oct. 27, 2016 for corresponding European Patent Application No. 16163889.5.

"A Shape-Adaptive Thin-Film Based Approach for 50% High-Efficiency Energy Generation Through Micro-Grating Sliding Electrification", Guang Zhu et al., Advanced Materials. 2014, 26, 3788-3796.

"Hydrophobic Sponge Structure-Based Triboelectric Nanogenerator", Keun Young Lee et al., Advanced Materials. 2014, 26, 5037-5042.

F.-R. Fan, et al., "Flexible triboelectric generator!", Nano Energy (2012), doi: 10.1016/j.nanoen.2012.01.004.

"Nanoscale Triboelectric-Effect-Enabled Energy Conversion for Sustainably Powering Portable Electronics", Sihong Wang et al., American Chemical Society Publications, Nano Letters, 2012, 12, 6339-6346.

"Segmentally Structured Disk Triboelectric Nanogenerator for Harvesting Rotational Mechanical Energy", Long Lin et al., American Chemical Society Publications, Nano Letters, 2013, 13, 2916-2923.

"Radial-arrayed rotary electrification for high performance triboelectric generator", Guang Zhu et al., Nature Communications, Mar. 4, 2014.

"Integrated Multilayered Triboelectric Nanogenerator for Harvesting Biomechanical Energy from Human Motions", Peng Bai et al., American Chemical Society, vol. 7, No. 4, 3713-3719, (2013).

"Large-scale pattern growth of graphene films for stretchable transparent electrodes", Keun Soo Kim et al., Nature, vol. 457, Feb. 5, 2009.

Chinese Office Action dated Nov. 5, 2018 issued in corresponding Chinese Application No. 201610244475.4 (with English translation).

* cited by examiner

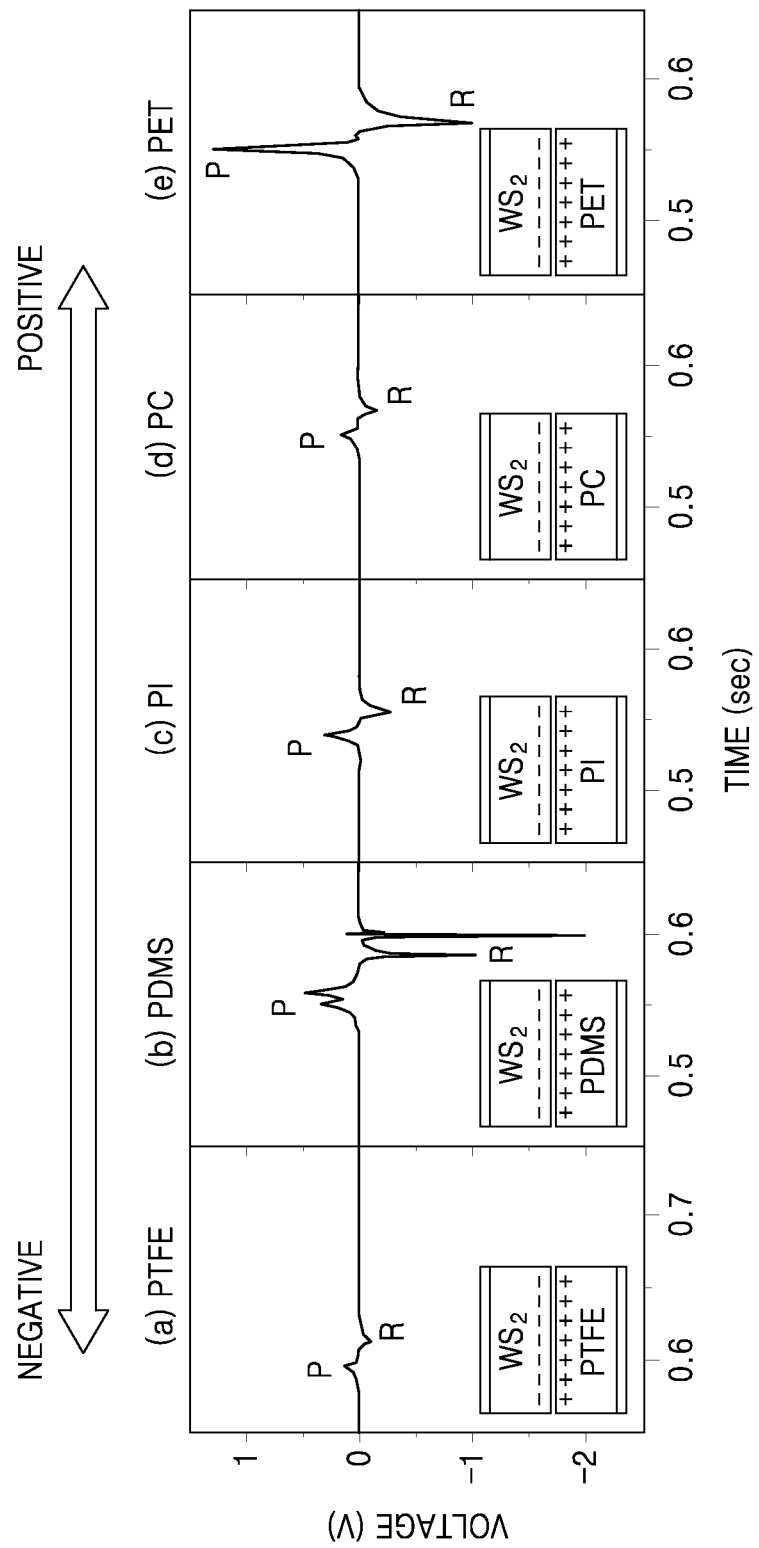

TRIBOELECTRIC GENERATOR

CROSS-REFERENCE TO RELATED APPLICATION

This application claims the benefits of priority from Korean Patent Application No. 10-2015-0056003, filed on Apr. 21, 2015, and Korean Patent Application No. 10-2015-0138615, filed on Oct. 1, 2015, in the Korean Intellectual Property Office, the disclosures of which are incorporated herein in their entirety by reference.

BACKGROUND

1. Field

Example embodiments relate to a triboelectric generator, and more particularly, to a triboelectric generator using a one-dimensional nanomaterial or a two-dimensional material

2. Description of the Related Art

Energy harvesting devices are new eco-friendly energy generating devices that may extract energy by converting mechanical energy generated from wind, vibrations, or movements of a person with respect to a surrounding environment to electric energy.

SUMMARY

Example embodiments relate to a triboelectric generator using a one-dimensional nanomaterial or a two-dimensional material.

Additional example embodiments will be set forth in part in the description which follows and, in part, will be apparent from the description, or may be learned by practice of the example embodiments.

According to an example embodiment, a triboelectric generator includes first and second electrodes provided to face each other, and a first energy generation layer provided on the first electrode and generating electric energy through contact with other material, the first energy generation layer including a two-dimensional (2D) material having a crystal structure of a 2D shape.

The two-dimensional material may include at least one of hexagonal-boron nitride (h-BN) and transition metal dichalcogenide (TMD). The TMD may include one metal element from Mo, W, Nb, V, Ta, Ti, Zr, Hf, Tc, Re, Cu, Ga, In, Sn, Ge, and Pb and one chalcogen element from S, Se, and Te.

The 2D material may have a single layer or a multilayer structure. The 2D material may have a thickness of about 0.3 nm to about 1000 nm.

The 2D material may be doped or undoped. The triboelectric generator may further include a spacer provided between the first electrode and the second electrode.

The first energy layer may generate electric energy through contact with the second electrode.

The triboelectric generator may further include at least one of a first substrate on which the first electrode and the first energy generation layer are provided and a second substrate on which the second electrode is provided. The first energy generation layer may generate electric energy through contact with the second electrode or the second substrate.

At least one of the first and second substrates may be stretchable. At least one of the first and second substrates may include at least one of polydimethylsiloxane (PDMS), polyimide (PI), Teflon, urethane, and nylon. At least one of the first and second substrates may have an elongation percentage of about 200% or low.

At least one of the first and second substrates may have a surface having a shape of a wavy pattern. The first electrode and the first energy generation layer may have a shape corresponding to a surface of the first substrate and the second electrode may have a shape corresponding to a surface of the second substrate.

At least one of the first and second electrodes may include at least one of carbon nanotube (CNT), graphene, Ag nanowire, metal, and metal mesh.

The triboelectric generator may further include a second energy generation layer provided on the second electrode and generating electric energy through contact with the first energy generation layer. The triboelectric generator may further include at least one of a first substrate on which the first electrode and the first energy generation layer are provided, and a second substrate on which the second electrode and the second energy generation layer are provided. At least one of the first and second substrates may be stretchable.

According to another example embodiment, a triboelectric generator includes first and second electrodes provided to face each other and having stretchability, and a first energy generation layer provided on the first electrode and generating electric energy through contact with another material or other materials.

The first energy generation layer may include at least one of one-dimensional (1D) material having a 1D shape of a nano size and a two-dimensional (2D) material having a crystal structure of a 2D shape. The 1D nanomaterial may include CNT and the 2D material includes at least one of graphene, h-BN, and TMD.

The first energy generation layer may generate electric energy through contact with the second electrode.

The triboelectric generator may further include at least one of a first substrate that is stretchable, on which the first electrode and the first energy generation layer are provided, and a second substrate that is stretchable, on which the second electrode is provided.

The first energy generation layer may generate electric energy through contact with the second electrode or the second substrate.

At least one of the first and second substrates may have a surface having a shape of a wavy pattern.

The first electrode and the first energy generation layer may have a shape corresponding to a surface of the first substrate, and the second electrode has a shape corresponding to a surface of the second substrate.

The triboelectric generator may further include a second energy generation layer provided on the second electrode and generating electric energy through contact with the first energy generation layer.

The triboelectric generator may further include at least one of a first substrate that is stretchable, on which the first electrode and the first energy generation layer are provided, and a second substrate that is stretchable, on which the second electrode and the second energy generation layer are provided.

According to another example embodiment, a triboelectric generator includes a plurality of energy generation units that are stacked on top of each other, wherein each of, or one or more of, the energy generation units includes first and second electrodes provided to face each other, and a first energy generation layer provided on the first electrode and generating electric energy through contact with other material, the first energy generation layer including a 2D material having a crystal structure of a 2D shape.

The 2D material may include at least one of graphene, h-BN, and TMD.

The triboelectric generator may further include a second energy generation layer provided on the second electrode and generating electric energy through contact with the first energy generation layer.

The energy generation units may be serially connected to one another.

According to another example embodiment, a triboelectric generator includes a plurality of energy generation units that are stacked on top of each other, wherein each of, or one or more of, the energy generation units includes first and second electrodes provided to face each other and having stretchability, and a first energy generation layer provided on the first electrode and generating electric energy through contact with other material.

The first energy generation layer may include at least one of a 1D material having a 1D shape of a nano size and a 2D material having a crystal structure of a 2D shape. The 1D nanomaterial may include CNT and the 2D material includes at least one of graphene, h-BN, and TMD.

The triboelectric generator may further include a second energy generation layer provided on the second electrode and generating electric energy through contact with the first energy generation layer.

BRIEF DESCRIPTION OF THE DRAWINGS

These and/or other example embodiments will become apparent and more readily appreciated from the following description, taken in conjunction with the accompanying drawings in which:

FIG. 16 illustrates charging characteristics of a $WS_2$ material;

DETAILED DESCRIPTION

Figure 1:
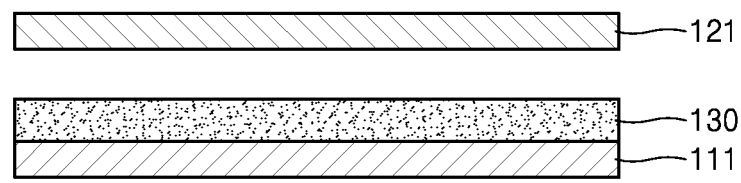
FIG. 1 is a cross-sectional view of a triboelectric generator according to an example embodiment.

Reference will now be made in detail to example embodiments illustrated in the accompanying drawings, wherein like reference numerals refer to like elements throughout. The thickness or size of each layer illustrated in the drawings may be exaggerated for convenience of explanation and clarity. Also, in the following description, when a layer is described to exist on another layer, the layer may exist directly on the other layer or a third layer may be interposed therebetween. Since a material forming each layer in the following example embodiments is an example, other materials may be used therefor. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

In the drawing figures, the dimensions of layers and regions may be exaggerated for clarity of illustration. Like reference numerals refer to like elements throughout. The same reference numbers indicate the same components throughout the specification.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

FIG. 1 is a cross-sectional view of a triboelectric generator according to an example embodiment.

Referring to FIG. 1, the triboelectric generator according to at least one example embodiment may include first and second electrodes 111 and 121 separated from and facing each other, and an energy generation layer 130 provided on the first electrode 111. The energy generation layer 130 is provided on an upper surface of the first electrode 111 facing the second electrode 121.

The first and second electrodes 111 and 121 may include a conductive material. For example, the first and second electrodes 111 and 121 may have rigid characteristics. Alternatively, one or both of the first and second electrodes 111 and 121 may be flexible and stretchable. In this case, a flexible and stretchable electrode may include, for example, one or two or more combinations of carbon nanotube (CNT), graphene, Ag nanowire, metal, and metal mesh, but the example embodiments are not limited thereto. Also, the flexible and stretchable electrode may include fabric woven with conductive fibers. As such, the flexible and stretchable electrode may have, for example, an elongation percentage of about 200% or lower. However, the example embodiments are not limited thereto.

The energy generation layer 130 is provided on the upper surface of the first electrode 111 and may generate electric energy through contact with the second electrode 121. The energy generation layer 130 may include a material having charging characteristics that are different from the second electrode 121. The energy generation layer 130 may include a two-dimensional (2D) material. The 2D material may be a material having a crystal structure of a 2D shape. The 2D material may include, for example, hexagonal-boron nitride (h-BN) and/or transition metal dichalcogenide (TMD).

The 2D material may have a monolayer structure or a multilayer structure. For example, the number of layers of the 2D material may be about 1~300, but the example embodiments are not limited thereto. Each layer forming the 2D material may have a thickness of an atomic level. The thickness of the 2D material may be, for example, about 0.3 nm~about 1000 nm, but the example embodiments are not limited thereto. The layers of the 2D material having a multilayer structure may be combined by the van der Waals force.

In example embodiments, the h-BN is an insulating material having a crystal structure of a 2D shape. The h-BN may exhibit thermal stability, superior mechanical strength, high thermal conductivity, and a low dielectric constant. The TMD is a semiconductor having a crystal structure of a 2D shape. For example, the TMD may include one of transition metals such as Mo, W, Nb, V, Ta, Ti, Zr, Hf, Tc, and Re and one of chalcogen elements such as S, Se, and Te. The TMD may be expressed by, for example, $MX_2$, where M denotes a transition metal and X denotes a chalcogen element. The M may be Mo, W, Nb, V, Ta, Ti, Zr, Hf, Tc, or Re, and the X may be S, Se, or Te. In this case, the TDM may include, for example, $MoS_2$, $MoSe_2$, $MoTe_2$, $WS_2$, $WSe_2$, $WTe_2$, $ZrS_2$, $ZrSe_2$, $HfS_2$, $HfSe_2$, $NbSe_2$, or $ReSe_2$. Alternatively, the TMD may not be expressed by $MX_2$. In this case, for example, the TMD may include CuS that is a compound of Cu that is a transition metal and S that is a chalcogen element. Alternatively, the TMD may be a chalcogenide material including a non-transition metal. The non-transition metal may include, for example, Ga, In, Sn, Ge, or Pb. In this case, the TMD may include a compound of a non-transition metal such as Ga, In, Sn, Ge, or Pb and a chalcogen element such as S, Se, or Te. For example, the TMD may include $SnSe_2$, GaS, GaSe, GaTe, GeSe, $In_2Se_3$, or $InSnS_2$.

In summary, the TMD may include one metal element of Mo, W, Nb, V, Ta, Ti, Zr, Hf, Tc, Re, Cu, Ga, In, Sn, Ge, and Pb and one chalcogen element of S, Se, and Te. However, the above-described materials are mere examples and other materials may be used as a TMD material.

When the first and second electrodes 111 and 121 are all flexible and stretchable electrodes, the energy generation layer 130 may include a one-dimensional (1D) nano-material and/or a 2D material. The 1D nano-material signifies a material having a 1D shape of a nano size. The 1D nano-material may include, for example, CNT. The 2D material may include, for example, graphene, h-BN, and/or TMD. The graphene is a conductive material obtained as carbon atoms are bonded in a hexagonal 2D shape.

In order to control charging characteristics of a surface of the energy generation layer 130, the 2D material or 1D nano-material forming the energy generation layer 130 may be doped with a p-type dopant or an n-type dopant. The p-type dopant and the n-type dopant may be, for example, a p-type dopant and an n-type dopant used for graphene or CNT. The p-type dopant or the n-type dopant may be doped in an ion implantation or chemical doping method.

A source of the p-type dopant may include, for example, ionic liquid such as $NO_2BF_4$, $NOBF_4$, or $NO_2SbF_6$, an acidic compound such as HCl, $H_2PO_4$, $CH_3COOH$, $H_2SO_4$, or $HNO_3$, and an organic compound such as dichlorodicyanoquinone (DDQ), oxone, dimyristoylphosphatidylinositol (DMPI), or trifluoromethanesulfoneimide. A source of the p-type dopant may include $HPtCl_4$, $AuCl_3$, $HAuCl_4$, silver trifluoromethanesulfonate (AgOTf), $AgNO_3$, $H_2PdCl_6$, $Pd(OAc)_2$, or $Cu(CN)_2$.

A source of the n-type dopant may include, for example, a reduction product of a substituted or unsubstituted nicotinamide, a reduction product of a compound which is chemically bound to a substituted or unsubstituted nicotinamide, and a compound comprising at least two pyridinium moieties in which a nitrogen atom of at least one of the pyridinium moieties is reduced. For example, the source of the n-type dopant may include nicotinamide mononucleotide-H (NMNH), nicotinamide adenine dinucleotide-H (NADH), nicotinamide adenine dinucleotide phosphate-H (NADPH), or viologen. Also, the source of the n-type dopant may include a polymer such as polyethylenimine (PEI). Also, the n-type dopant may include alkali metal such as K or Li. Alternatively, the above-described p-type dopant materials and n-type dopant materials are examples and other various materials may be used as dopants.

As such, when the energy generation layer 130 including the 2D material and/or 1D nano-material is formed on the first electrode 111 that is flexible and stretchable, the energy generation layer 130 may have flexibility and stretchability corresponding to, similar to or the same as the flexibility and stretchability of the first electrode 111.

In the example triboelectric generator configured as above, as the contact and separation process through pressing, bending, or sliding is repeated between the energy generation layer 130 and the second electrode 121, electric energy may be obtained through the first and second electrodes 111 and 121.

FIGS. 2A to 2E illustrate an operation of the triboelectric generator illustrated in FIG. 1 to generate electric energy by pressing or bending.

Figure 2A:
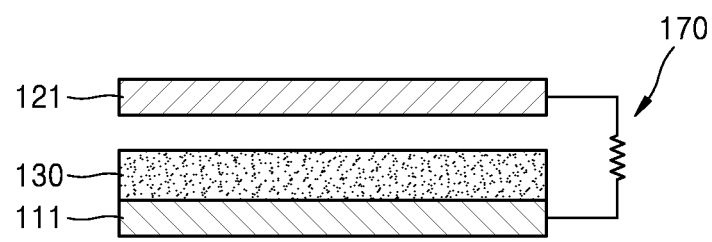
FIGS. 2A to 2E illustrate an operation of the triboelectric generator illustrated in FIG. 1 to generate electric energy by pressing or bending.
Figure 2B:
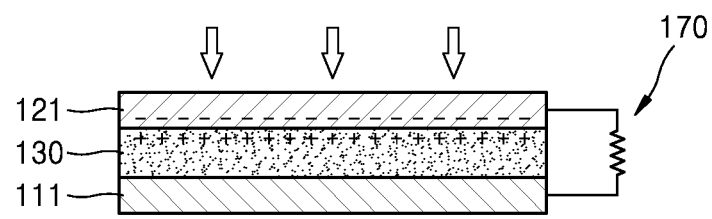

Referring to FIG. 2A, the energy generation layer 130 is provided on the upper surface of the first electrode 111, and the energy generation layer 130 and the second electrode 121 are separated by a desired, or alternatively predetermined distance from each other. The first and second electrodes 111 and 121 are connected to a measurement circuit 170 for measuring generated electric energy. Referring to FIG. 2B, an external pressure applied to the second electrode 121 makes the energy generation layer 130 provided on the first electrode 111 and the second electrode 121 contact each other. In the process, an upper surface of the energy generation layer 130 and a lower surface of the second electrode 121 contacting each other are charged with electric charges having desired or alternatively predetermined polarities by friction charging.

Figure 2C:
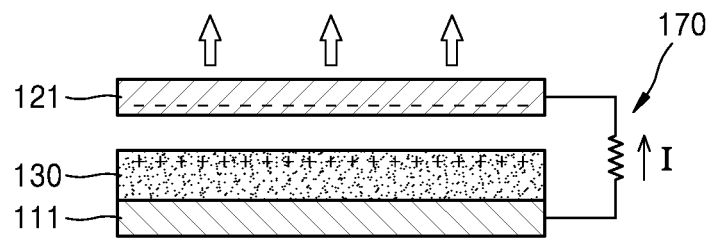
Figure 2D:
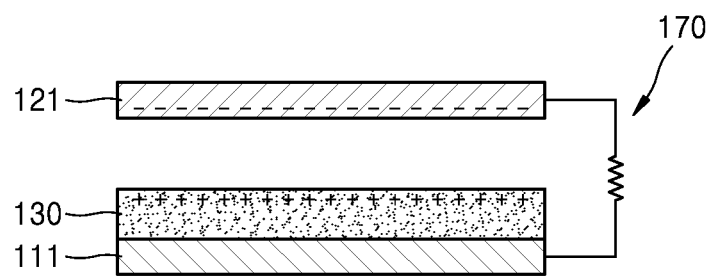
Figure 2E:
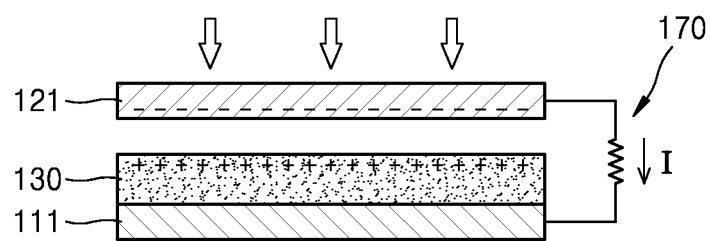

Referring to FIG. 2C, electric energy is generated by a process during which the second electrode 121 in contact with the energy generation layer 130 is separated from the energy generation layer 130. The generated electric energy may be obtained through the first and second electrodes 111 and 121. When the energy generation layer 130 and the second electrode 121 are separated by a desired or alternatively predetermined distance from each other as illustrated in FIG. 2D, a further pressure applied to the second electrode 121 moves the second electrode 121, as illustrated in FIG. 2E. As such, electric energy is generated during the process of the second electrode 121 being close to the energy generation layer 130. The generated electric energy may be obtained through the first and second electrodes 111 and 121. As illustrated in FIGS. 2C and 2E, a current generated during the process in which the second electrode 121 and the energy generation layer 130 are close to each other or spaced apart from each other may flow in opposite directions.

FIGS. 3A to 3D illustrate an operation of the triboelectric generator illustrated in FIG. 1 to generate electric energy by sliding.

Figure 3A:
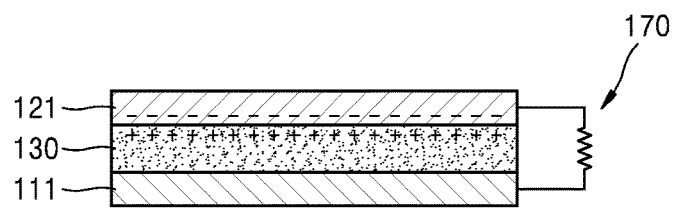
FIGS. 3A to 3D illustrate an operation of the triboelectric generator illustrated in FIG. 1 to generate electric energy by sliding.
Figure 3B:
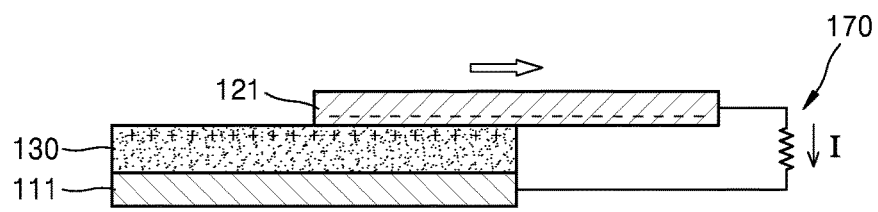

Referring to FIG. 3A, when the energy generation layer 130 and the second electrode 121 are in contact with each other, the upper surface of the energy generation layer 130 and the lower surface of the second electrode 121 contacting each other are charged with electric charges having desired or alternatively predetermined polarities by friction charging. Referring to FIG. 3B, in which the energy generation layer 130 and the second electrode 121 are in contact with each other, the second electrode 121 is slid in a direction away from the energy generation layer 130, that is, a direction in which an area of a contact surface between the second electrode 121 and the energy generation layer 130 decreases. As such, during the sliding process in which the second electrode 121 is moved away from the energy generation layer 130, electric energy is generated and the generated electric energy may be obtained through the first and second electrodes 111 and 121

Figure 3C:
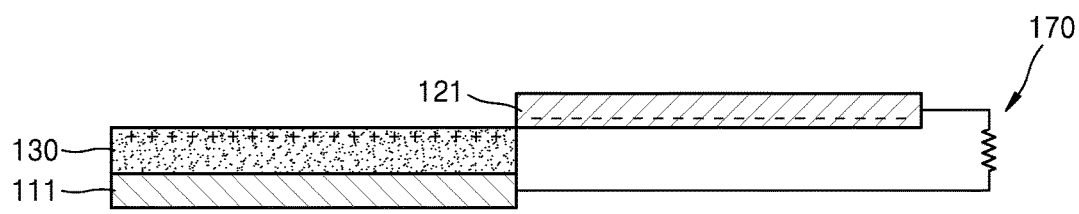
Figure 3D:
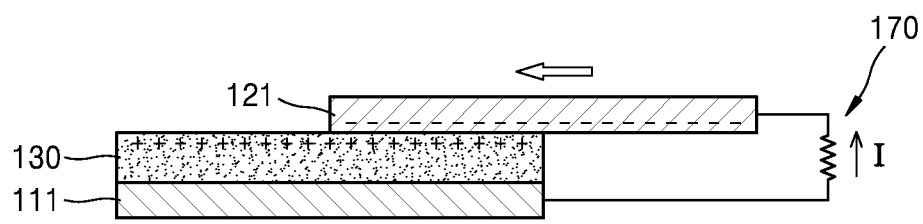

As illustrated from FIG. 3C, when the second electrode 121 is away from the energy generation layer 130, as illustrated in FIG. 3D, the second electrode 121 is slid back toward the energy generation layer 130, that is, a direction in which an area of the contact surface between the second electrode 121 and the energy generation layer 130 increases. As such, during the sliding process in which the second electrode 121 is moved closer to the energy generation layer 130, electric energy is generated, and the generated electric energy may be obtained through the first and second electrodes 111 and 121. As such, a current generated during the sliding process may flow in opposite directions (FIGS. 3B and 3D).

Figure 4:
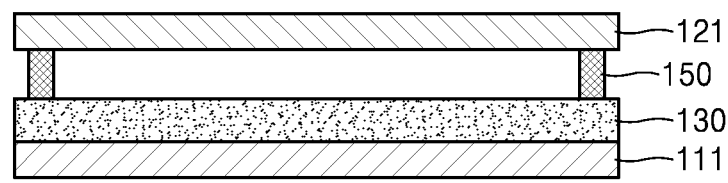
FIG. 4 is a cross-sectional view of a triboelectric generator according to another example embodiment

FIG. 4 is a cross-sectional view of a triboelectric generator according to another example embodiment.

In the triboelectric generator of FIG. 4, one or more spacers 150 may be provided between the energy generation layer 130 and the second electrode 121. The one or more spacers 150 may maintain a desired or alternatively predetermined interval between the energy generation layer 130 and the second electrode 121 in a state in which no external mechanical energy is applied to the triboelectric generator.

Figure 5:
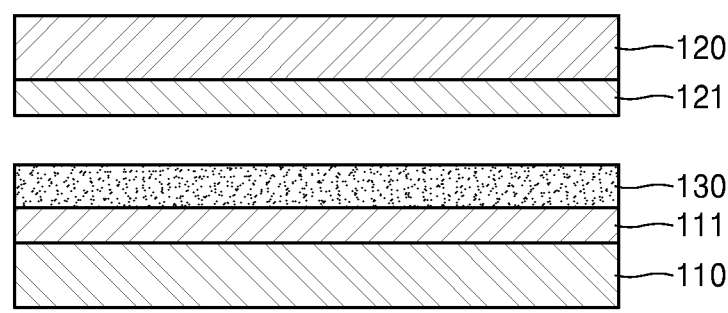
FIG. 5 is a cross-sectional view of a triboelectric generator according to another example embodiment

FIG. 5 is a cross-sectional view of a triboelectric generator according to another example embodiment.

Referring to FIG. 5, the triboelectric generator according to the example embodiment may include first and second substrates 110 and 120 separated from each other, the first and second electrodes 111 and 121 respectively provided on the first and second substrates 110 and 120, and the energy generation layer 130 provided on the first electrode 111.

The first and second substrates 110 and 120 may be formed of or include a rigid material, for example, a glass substrate or a silicon substrate. Alternatively, one or both of the first and second substrates 110 and 120 may be flexible and stretchable substrates. The flexible and stretchable substrates may include, for example, one or two or more combinations of polydimethylsiloxane (PDMS), polyimide (PI), Teflon, urethane, and nylon. However, the example embodiments are not limited thereto. Also, the flexible and stretchable substrates may include fabric woven with fibers. The flexible and stretchable substrates may have an elongation percentage of low, but the example embodiments are not limited thereto.

The first electrode 111 is provided on an upper surface of the first substrate 110, and the second electrode 121 is provided on a lower surface of the second substrate 120. One or both of the first and second electrodes 111 and 121 may be flexible and stretchable electrodes corresponding to the first and second substrates 110 and 120.

The energy generation layer 130 that generates electric energy through friction with the second electrode 121 is provided on the upper surface of the first electrode 111. The energy generation layer 130 generates electric energy through contact with the second electrode 121. The energy generation layer 130 may include, for example, a 2D material including h-BN and/or TMD. When the first and second electrodes 111 and 121 are all flexible and stretchable electrodes, the energy generation layer 130 may include a 1D nano-material and/or a 2D material. The 1D nano-material may include CNT and the 2D material may include graphene, h-BN, and/or TMD. Although in the above description both the first and second substrates 110 and 120 are provided, the example embodiments are not limited thereto and any one of the first and second substrates 110 and 120 may be provided.

Figure 6:
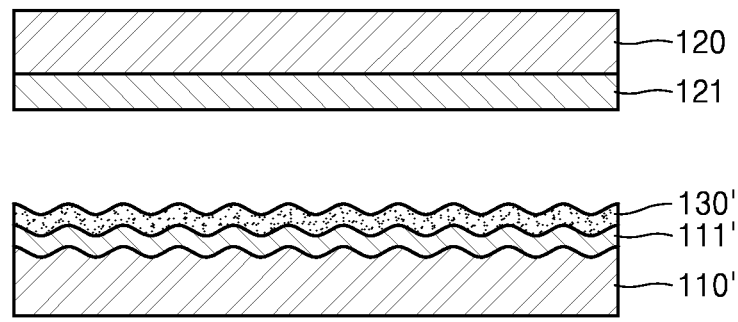
FIG. 6 is a cross-sectional view of a triboelectric generator according to another example embodiment

FIG. 6 is a cross-sectional view of a triboelectric generator according to another example embodiment.

Referring to FIG. 6, the triboelectric generator according to the example embodiment may include first and second substrates 110' and 120 separated from each other, first and second electrode 111' and 121 respectively provided on the first and second substrates 110' and 120, the energy generation layer 130' being provided on the first electrode 111'.

In the example embodiment, the first substrate 110' may be a flexible and stretchable substrate. The first substrate 110' may have, for example, an elongation percentage of about 200% or lower, but the example embodiment is not limited thereto. An upper surface of the first substrate 110' may have a shape of a wavy pattern. The first electrode 111' and the energy generation layer 130' are sequentially provided on the upper surface of the first substrate 110'. Accordingly, the first electrode 111' and the energy generation layer 130' may have a wavy pattern substantially corresponding to the upper surface of the first substrate 110'. The first electrode 111' and the energy generation layer 130' may have flexibility and stretchability like the first substrate 110'. In this case, the first electrode 111' may include, for example, one or two or more combinations of CNT, graphene, Ag nanowire, metal, and metal mesh, but the example embodiment is not limited thereto. The energy generation layer 130' generates electric energy through friction with the second electrode 121. The energy generation layer 130' may include, for example, a 2D material including h-BN and/or TMD.

Both of the first and second substrates 110' and 120 may be flexible and stretchable substrates. In this case, the first electrode 111' and the energy generation layer 130' may have flexibility and stretchability corresponding to, similar to or the same as the flexibility and stretchability of the first substrate 110'. The second electrode 121 may have flexibility and stretchability corresponding to, similar to or the same as the flexibility and stretchability of the second substrate 120. In this case, the energy generation layer 130' may include a 1D nano-material and/or a 2D material. The 1D nano-material may include, for example, CNT, and the 2D material may include, for example, graphene, h-BN, and/or TMD.

A method of forming the first electrode 111' and the energy generation layer 130' having a shape of a wavy pattern on the first substrate 110' is described as follows. First, the first substrate 110' having stretchability is prepared and stretched. Next, the first electrode 111' and the energy generation layer 130' are sequentially formed on the upper surface of the first substrate 110' in a stretched state. Next, when the first substrate 110' that is stretched is contracted to an original state, the upper surface of the first substrate 110' may have a shape of a wavy pattern due to contraction. Accordingly, the first electrode 111' and the energy generation layer 130' may have a shape of a wavy pattern due to contraction.

As described above, when the energy generation layer 130' is formed in the shape of a wavy pattern, a contact area between the second electrode 121 and the energy generation layer 130' increases and thus an amount of electric energy generated per unit area may be increased. Alternatively, although in the above description the first electrode 111' and the energy generation layer 130' have a shape of a wavy pattern, the example embodiments are not limited thereto and the second electrode 121 may have the shape of a wavy pattern or all the first electrode 111', the energy generation layer 130', and the second electrode 121 may have the shape of a wavy pattern.

Figure 7:
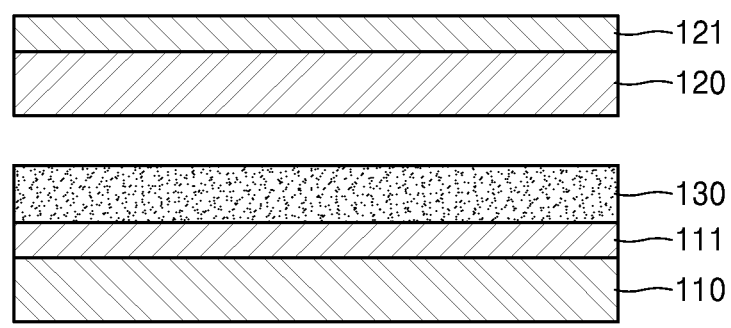
FIG. 7 is a cross-sectional view of a triboelectric generator according to another example embodiment

FIG. 7 is a cross-sectional view of a triboelectric generator according to another example embodiment.

Referring to FIG. 7, the triboelectric generator according to the example embodiment may include the first and second substrates 110 and 120 separated from each other, the first and second electrodes 111 and 121 being respectively provided on the first and second substrates 110 and 120, the energy generation layer 130 provided on the first electrode 111. The first electrode 111 is provided on the upper surface of the first substrate 110, and the second electrode 121 is provided on an upper surface of the second substrate 120. The energy generation layer 130 is provided on the upper surface of the first electrode 111.

The first and second substrates 110 and 120 may include, for example, a substrate formed of or include a rigid material. Alternatively, one or two or more of the first and second substrates 110 and 120 may be flexible and stretchable substrates. The flexible and stretchable substrates may include one or two or more combinations of PDMS, PI, Teflon, urethane, and nylon. However, the example embodiment is not limited thereto. Surfaces of flexible and stretchable substrates may have the shape of a wavy pattern. In this case, the first electrode 111 and the energy generation layer 130 formed on the first substrate 110 may have a shape substantially corresponding to the surface of the first substrate 110. The second electrode 121 formed on the second substrate 120 may have a shape substantially corresponding to the surface of the second substrate 120.

The energy generation layer 130 generates electric energy through friction with the second substrate 120. The energy generation layer 130 may include, for example, a 2D material including h-BN and/or TMD.

When the first and second substrates 110 and 120 are flexible and stretchable substrates, the first and second electrodes 111 and 121 may also have flexibility and stretchability. In this case, the energy generation layer 130 may include a 1D nano-material and/or a 2D material. The 1D nano-material may include, for example, CNT, and the 2D material may include, for example, graphene, h-BN, and/or TMD.

Figure 8:
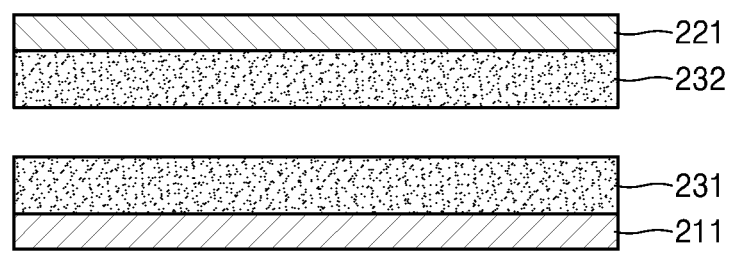
FIG. 8 is a cross-sectional view of a triboelectric generator according to another example embodiment

FIG. 8 is a cross-sectional view of a triboelectric generator according to another example embodiment.

Referring to FIG. 8, the triboelectric generator according to the example embodiment may include first and second electrodes 211 and 221 separated from each other, first and second energy generation layers 231 and 232 respectively provided on the first and second electrodes 211 and 221. One or both of the first and second electrodes 211 and 221 may be flexible and stretchable electrodes. The first and second electrodes 211 and 221 may include, for example, one or two or more combinations of CNT, graphene, Ag nanowire, metal, and metal mesh, but the example embodiment is not limited thereto.

The first energy generation layer 231 is provided on an upper surface of the first electrode 211, and the second energy generation layer 232 is provided on a lower surface of the second electrode 221. The first energy generation layer 231 generates electric energy through contact with the second energy generation layer 232 and may include a 2D material having a crystal structure of a 2D shape. The 2D material may include, for example, one or both of h-BN and TMD. The TMD may include one metal element from Mo, W, Nb, V, Ta, Ti, Zr, Hf, Tc, Re, Cu, Ga, In, Sn, Ge, and Pb and one chalcogen element from S, Se, and Te.

The 2D material may have a monolayer structure or a multilayer structure. For example, the number of layers of the 2D material may be about 1~300 and the thickness of the 2D material may be about 0.3 nm~about 1000 nm. However, the example embodiment is not limited thereto. Meanwhile, the 2D material may be doped with a p-type dopant or an n-type dopant. When the first energy generation layer 231 is provided on the first electrode 211 that is flexible and stretchable, the first energy generation layer 231 may have flexibility and stretchability corresponding to the first electrode 211.

When both of the first and second electrodes 211 and 221 have flexibility and stretchability, the first energy generation layer 231 may include a 1D nano-material and/or a 2D material. The 1D nano-material may include, for example, CNT, and the 2D material may include, for example, graphene, h-BN, and/or TMD.

The second energy generation layer 232 may include various materials having charging characteristics that are different from the first energy generation layer 231. For example, the second energy generation layer 232 may include PDMS, PI, Teflon, urethane, or nylon. Also, the second energy generation layer 232 may include CNT, graphene, or the above-described 2D material. In this case, the first energy generation layer 231 may not be doped and the second energy generation layer 232 may be doped with a p-type dopant or an n-type dopant. Also, the first energy generation layer 231 and the second energy generation layer 232 may be doped with other dopants or doped at a difference doping concentration. When the second energy generation layer 232 is provided on the second electrode 221 that is flexible and stretchable, the second energy generation layer 232 may have flexibility and stretchability corresponding to, similar to or the same as the flexibility and stretchability of the second electrode 221.

Figure 9:
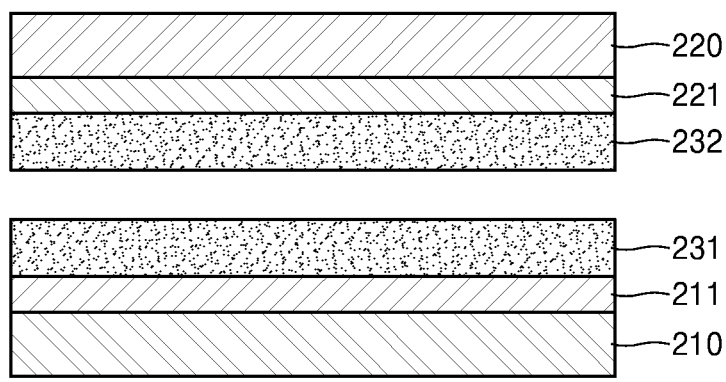
FIG. 9 is a cross-sectional view of a triboelectric generator according to another example embodiment

FIG. 9 is a cross-sectional view of a triboelectric generator according to another example embodiment.

Referring to FIG. 9, the triboelectric generator according to the example embodiment may include first and second substrates 210 and 220 separated from each other, the first and second electrodes 211 and 221 respectively provided on the first and second substrates 210 and 220, and the first and second energy generation layers 231 and 232 respectively provided on the first and second electrodes 211 and 221.

The first and second substrates 210 and 220 may be, for example, a substrate formed of or include a rigid material, such as, a glass substrate or a silicon substrate. Alternatively, one or both of the first and second substrates 210 and 220 may be flexible and stretchable substrates. The flexible and stretchable substrates may include, for example, one or two or more combinations of PDMS, PI, Teflon, urethane, and nylon, but the example embodiment is not limited thereto. Although the substrates may have an elongation percentage of about 200% or low, the example embodiment is not limited thereto.

The first electrode 211 is provided on the upper surface of the first substrate 210, and the second electrode 221 is provided on the lower surface of the second substrate 220. One or both of the first and second electrodes 211 and 221 may have flexibility and stretchability corresponding to, similar to or the same as the flexibility and stretchability of the first and second substrates 210 and 220. The first energy generation layer 231 is provided on the upper surface of the first electrode 211, and the second energy generation layer 232 is provided on the lower surface of the second electrode 221.

The first energy generation layer 231 may include, for example, a 2D material including h-BN and/or TMD. When both of the first and second electrodes 211 and 221 have flexibility and stretchability, the first energy generation layer 231 may include a 1D nano-material and/or a 2D material. The 1D nano-material may include, for example, CNT and the 2D material may include, for example, graphene, h-BN, and/or TMD. The second energy generation layer 232 may include various materials having charging characteristics that may be different from the charging characteristics of the first energy generation layer 231.

When the first electrode 211 and the first energy generation layer 231 are provided on the first substrate 210 that is flexible and stretchable, the first electrode 211 and the first energy generation layer 231 may have flexibility and stretchability corresponding to, similar to or the same as the flexibility and stretchability of the first substrate 210. When the second electrode 221 and the second energy generation layer 232 are provided on the second substrate 220 that is flexible and stretchable, the second electrode 221 and the second energy generation layer 232 may also have flexibility and stretchability corresponding to, similar to or the same as the flexibility and stretchability of the second substrate 220. One or both of the first and second substrates 210 and 220 that are flexible and stretchable may have a surface of a wavy pattern. In this case, the first electrode 211 and the first energy generation layer 231 may have a shape corresponding to the surface of the first substrate 210. The second electrode 221 and the second energy generation layer 232 may have a shape corresponding to the surface of the second substrate 220. Alternatively, although in the above description both the first and second substrates 210 and 220 are provided, only one of the first and second substrates 210 and 220 may be provided.

Figure 10:
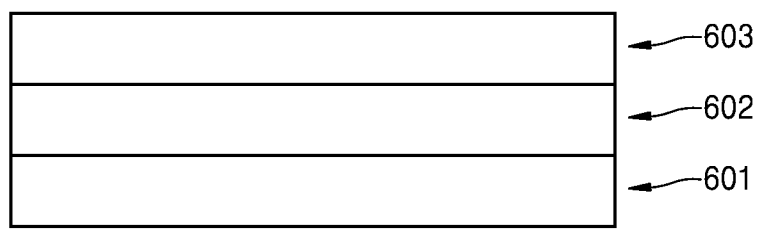
FIG. 10 illustrates a triboelectric generator according to another example embodiment.

In the above-described example embodiments, triboelectric generators including one energy generation unit are discussed. However, a triboelectric generator having a structure in which a plurality of energy generation units are vertically stacked may be implemented. FIG. 10 schematically illustrates a triboelectric generator according to another example embodiment.

Referring to FIG. 10, the triboelectric generator according to the example embodiment may include a plurality of energy generation units 601, 602, and 603 that are vertically stacked. The energy generation units 601, 602, and 603 may be the triboelectric generators of various types described in the above example embodiments. The energy generation units 601, 602, and 603 may be serially connected to one another to increase output energy of the triboelectric generator. However, the example embodiment is not limited thereto, and the energy generation units 601, 602, and 603 may be connected to one another in parallel. Although FIG. 16 illustrates a triboelectric generator that includes three (3) energy generation units 601, 602, and 603 that are vertically stacked, the example embodiments are not limited thereto and the triboelectric generator according to the example embodiment may include various numbers of vertically stacked energy generation units.

Figure 11:
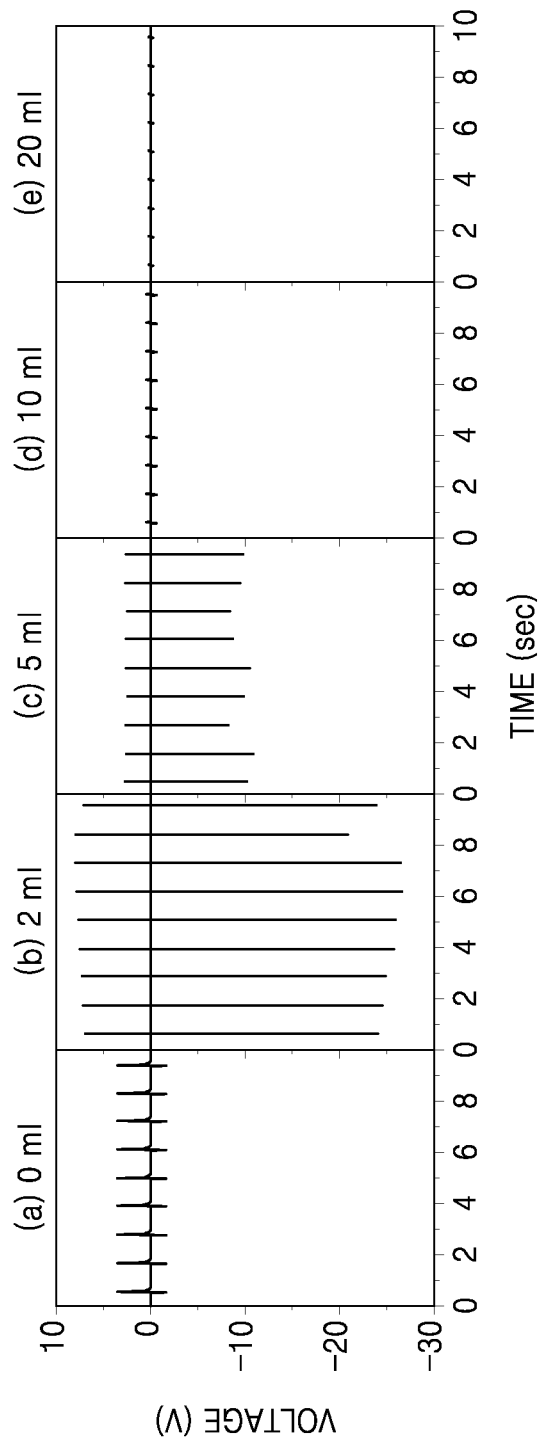
FIG. 11 illustrates output voltages according to a thickness of an energy generation layer formed of or include a two-dimensional material in a triboelectric generator according to an example embodiment.
Figure 12:
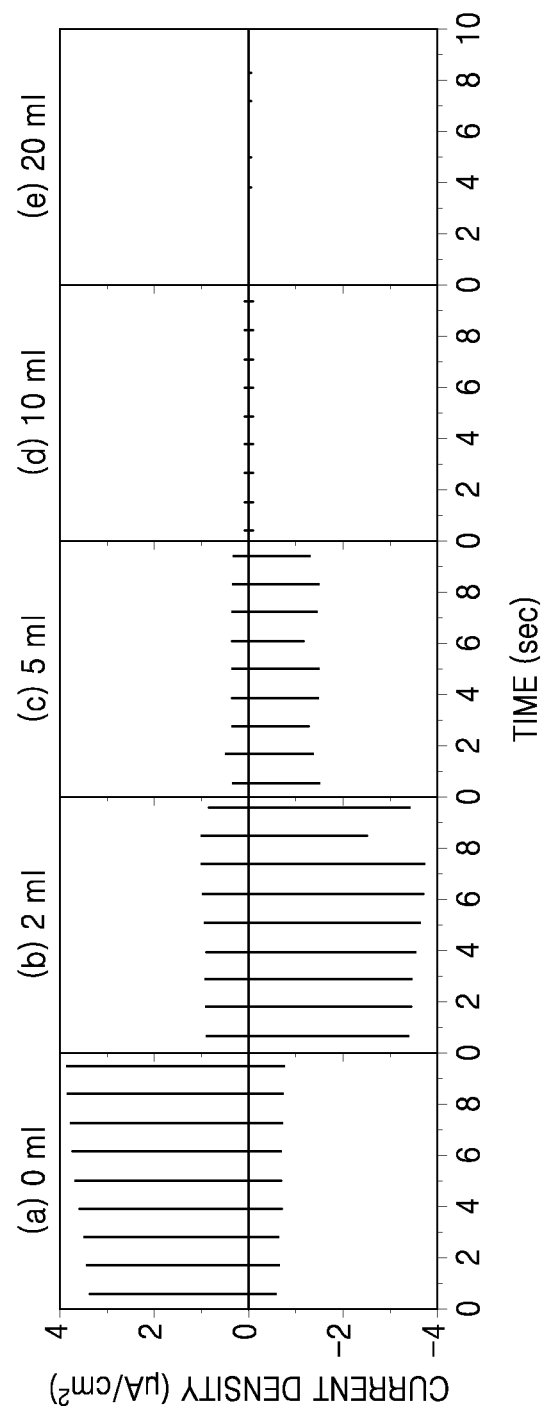
FIG. 12 illustrates output current densities according to a thickness of an energy generation layer formed of or include a two-dimensional material in a triboelectric generator according to an example embodiment.

FIG. 11 illustrates output voltages according to a thickness of an energy generation layer formed of or include a 2D material in a triboelectric generator, according to an example embodiment. FIG. 12 illustrates output current densities according to a thickness of an energy generation layer formed of a 2D material in a triboelectric generator according to an example embodiment.

In FIGS. 11 and 12, a $MoS_2$ film is used as an energy generation layer, and PDMS is used as a material contacting the $MoS_2$ film. The $MoS_2$ film is manufactured as follows. First, a bulk $MoS_2$ material is exfoliated through lithiation. Next, $MoS_2$ ink is manufactured by using the exfoliated $MoS_2$ material, and the $MoS_2$ ink is coated on a Cu electrode, thereby forming the $MoS_2$ film. As an amount of $MoS_2$ ink coated on the Cu electrode increases, the thickness of the $MoS_2$ film increases as well.

In FIGS. 11 and 12, "(a) 0 ml" denotes a case in which no $MoS_2$ ink is coated on the Cu electrode, and output voltage and output current density generated as the Cu electrode and PDMS are contacted with each other are illustrated. In FIGS. 11 and 12, "(b) 2 ml", "(c) 5 ml", "(d) 10 ml", and "(e) 20 ml" denote cases in which the Cu electrode is coated with the $MoS_2$ ink in amounts of 2 ml, 5 ml, 10 ml, and 20 ml, and output voltages and output current densities generated as the $MoS_2$ films and the PDMS are contacted with each other are illustrated. Referring to FIGS. 11 and 12, when the thickness of $MoS_2$ film is (b), the output voltage appears to be the highest. As a result, it may be seen that the output voltage increases as the thickness of $MoS_2$ film decreases.

Figure 13:
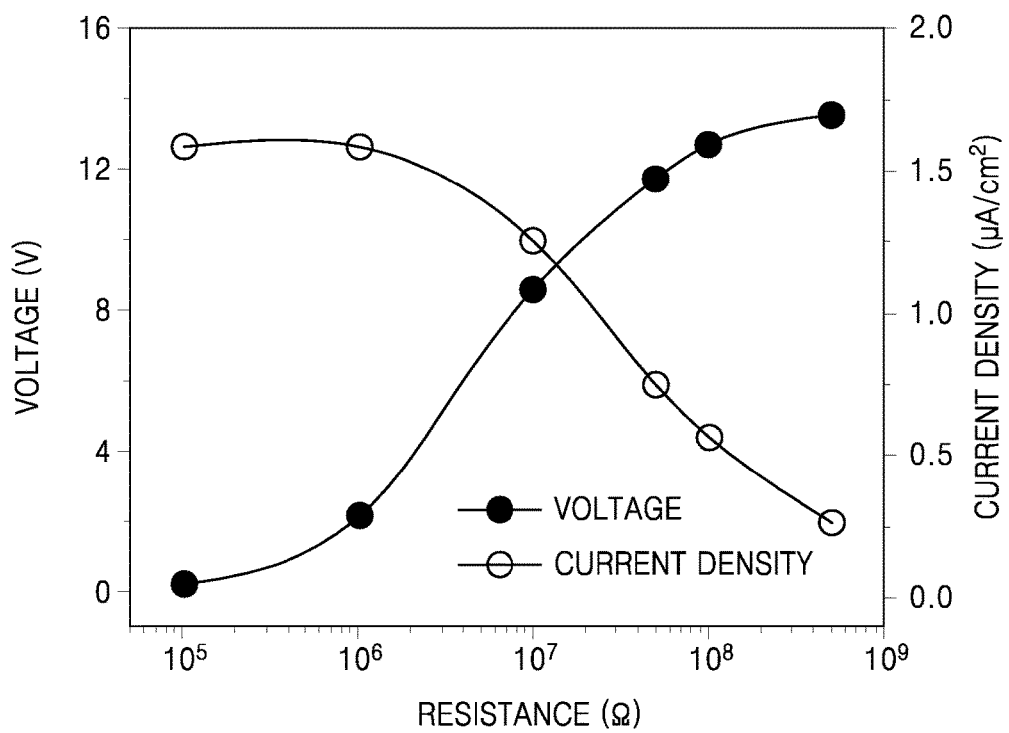
FIG. 13 illustrates an output voltage and an output current density according to resistance of a measurement circuit, in a triboelectric generator according to an example embodiment.
Figure 14:
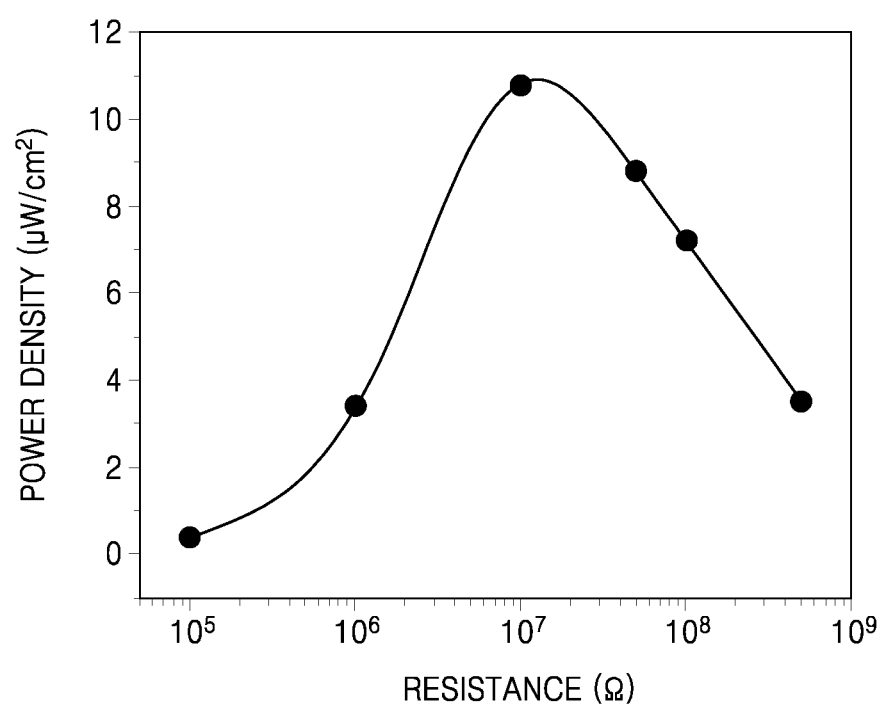
FIG. 14 illustrates an output power density according to resistance of a measurement circuit, in a triboelectric generator according to an example embodiment.

FIG. 13 illustrates an output voltage and an output current density according to resistance of a measurement circuit, in a triboelectric generator according to an example embodiment. FIG. 14 illustrates an output power density according to resistance of a measurement circuit, in a triboelectric generator according to an example embodiment. In FIG. 13, in the case of "(b) 2 ml" of FIGS. 11 and 12, that is, the Cu electrode is coated with the $MoS_2$ ink of 2 ml, the output voltages and output current densities generated as the manufactured $MoS_2$ film and the PDMS are in contact with each other are illustrated according to resistance of a measurement circuit connected to the triboelectric generator. FIG. 14 illustrates the output power density according to the resistance of the measurement circuit connected to the triboelectric generator by using the result of FIG. 13. Referring to FIGS. 13 and 14, it may be seen that the maximum power density is about 107.9 $mW/m^2$.

Figure 15:
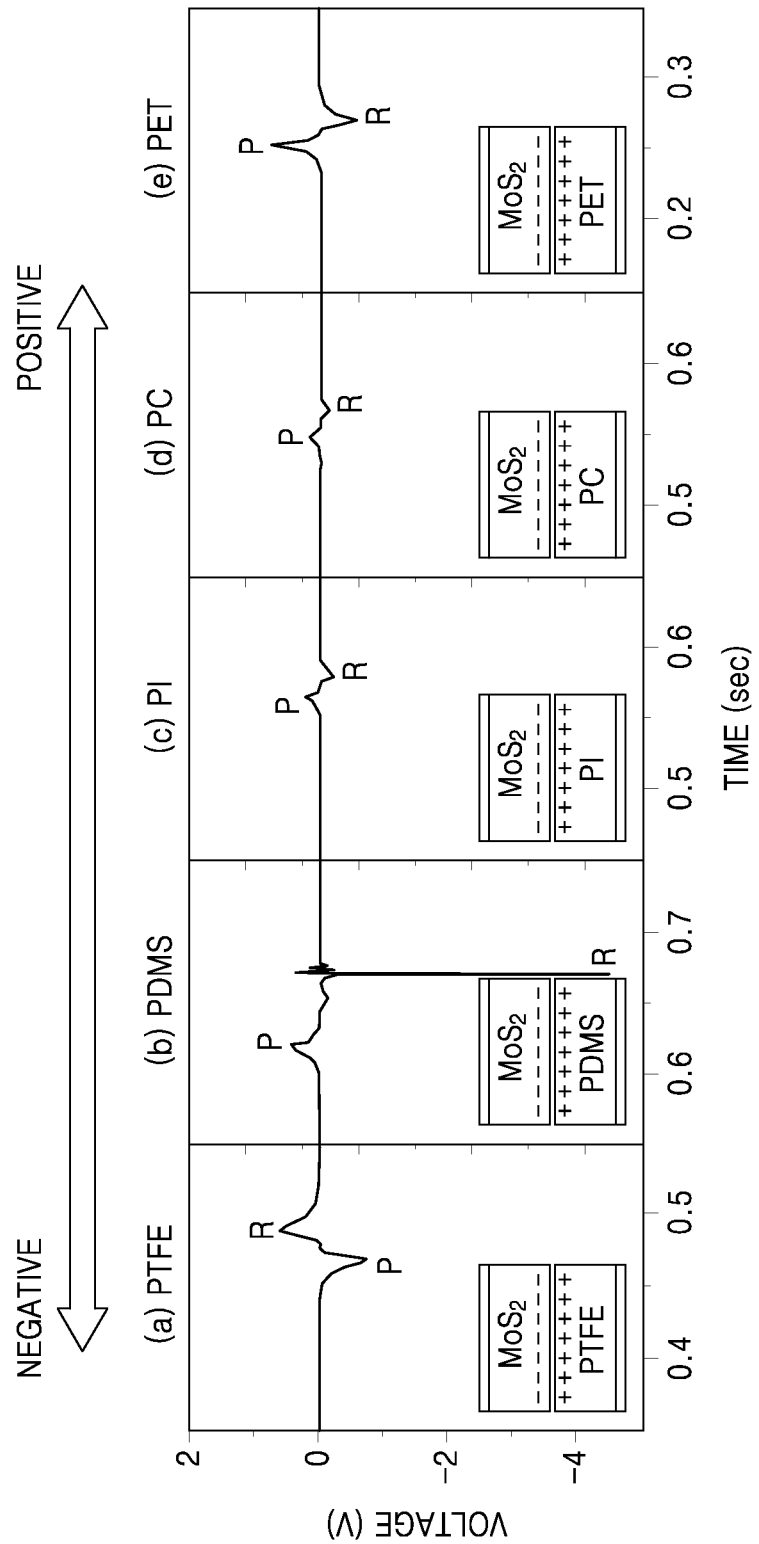
FIG. 15 illustrates charging characteristics of a $MoS_2$ material.

FIG. 15 illustrates charging characteristics of a $MoS_2$ material. In FIG. 15, a $MoS_2$ material is used as the energy generation layer, and output voltages generated when the $MoS_2$ material contacts other materials. In detail, in FIG. 15, "(a) Poly Tetra Fluoro Ethylene (PTFE)", "(b) Poly DiMethyl Siloxane (PDMS)", "(c) Poly Imide (PI)", "(d) Poly Carbonate (PC)", and "(e) Poly Ethylene Terephtalate (PET)" illustrate output voltages generated when the $MoS_2$ material contacts PTFE, PDMS, PI, PC, and PET, respectively. In FIG. 15, "P" denotes a case in which the $MoS_2$ material is pressed to be close to other material, and "R" denotes a case in which the pressed $MoS_2$ material is released to be separated from other material. Referring to FIG. 15, it may be seen that the $MoS_2$ material has friction electricity characteristics and the charging characteristics of the $MoS_2$ material is between the charging characteristics of PDMS and the charging characteristics of PTFE.

FIG. 16 illustrates charging characteristics of a $WS_2$ material. In FIG. 16, a $MoS_2$ material is used as the energy generation layer, and output voltages generated when the $WS_2$ material contacts other material are illustrated. In detail, in FIG. 16, "(a) PTFE", "(b) PDMS", "(c) PI", "(d) PC", and "(e) PET" illustrate output voltages generated when the $WS_2$ material contacts PTFE, PDMS, PI, PC, and PET. In FIG. 16, "P" denotes a case in which the $WS_2$ material is pressed to be close to other material, and "R" denotes a case in which the pressed $WS_2$ material is released to be separated from other material. Referring to FIG. 16, it may be seen that the $WS_2$ material has friction electricity characteristics and the charging characteristics of the $WS_2$ material is located at a position that is more negative than the charging characteristics of PTFE.

Figure 17A:
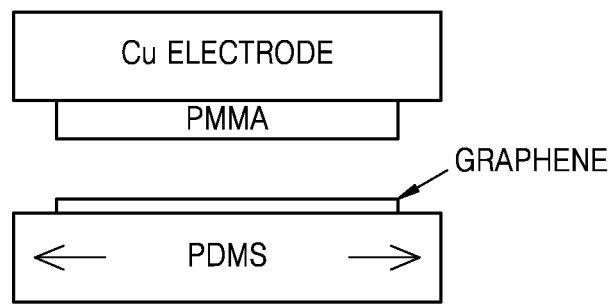
FIGS. 17A and 17B illustrate a method of manufacturing a triboelectric generator including graphene having a wavy pattern by using stretchability of a polydimethylsiloxane (PDMS) substrate.
Figure 17B:
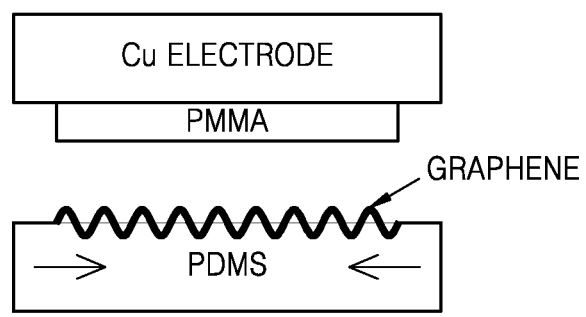

FIGS. 17A and 17B illustrate a method of manufacturing a triboelectric generator including graphene having a shape of a wavy pattern by using stretchability of a PDMS substrate, according to at least one example embodiment.

First, referring to FIG. 17A, after a PDMS substrate is stretched, graphene is formed on an upper surface of the stretched PDMS substrate. A Poly Methyl Meth Acrylate (PMMA) substrate on which a Cu electrode is deposited is provided on an upper portion of the PDMS substrate. Next, referring to FIG. 17B, when the stretched PDMS substrate is contracted to an original state, the upper surface of the PDMS substrate may have the shape of a wavy pattern due to contraction. Accordingly, the graphene formed on the upper surface of the PDMS substrate may have the shape of a wavy pattern.

Figure 18A:
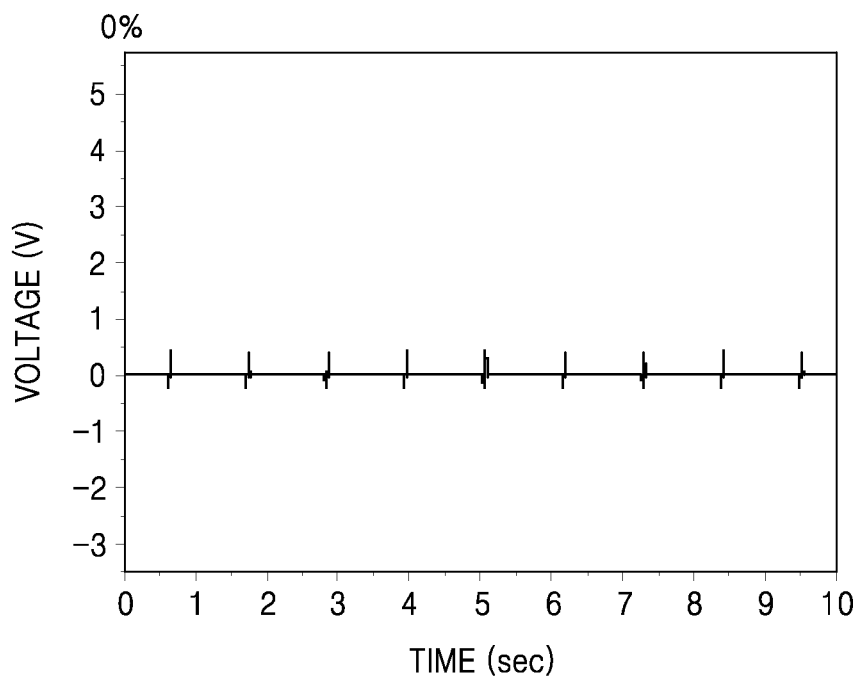
FIGS. 18A to 18C illustrate output voltages according to an elongation percentage of PDMS, in a triboelectric generator manufactured by the example method of FIGS. 17A and 17B.
Figure 18B:
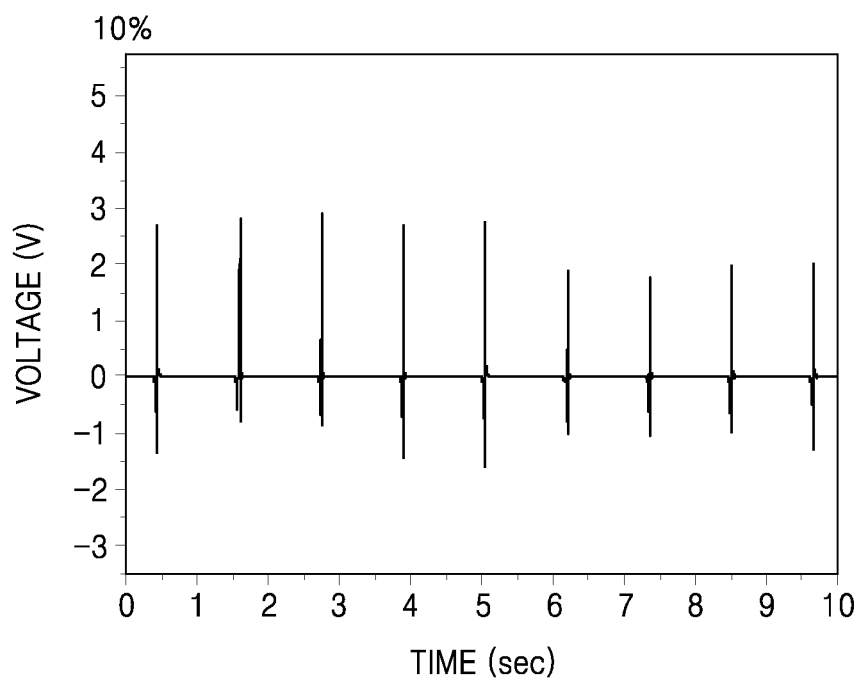
Figure 18C:
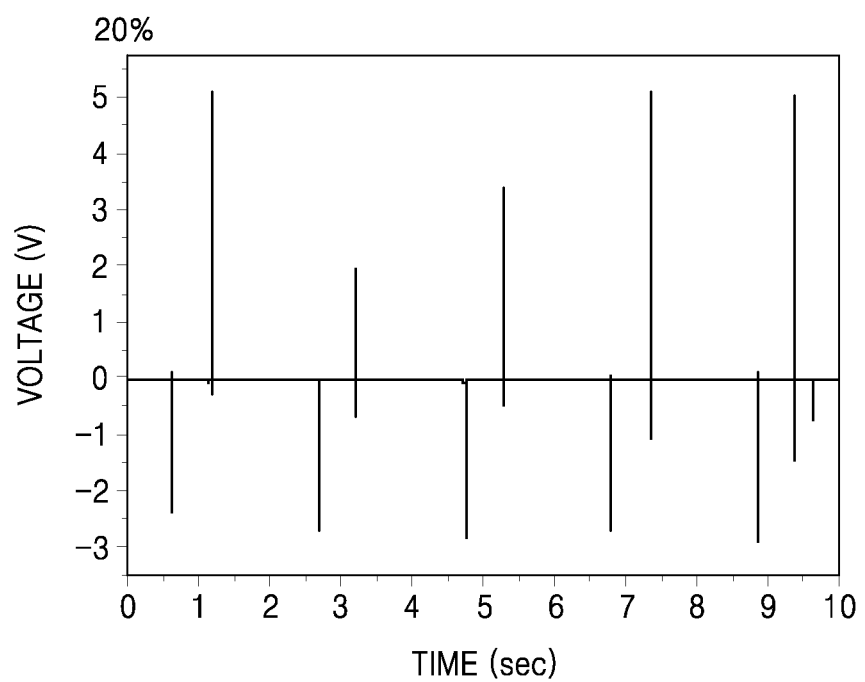

FIGS. 18A to 18C illustrate output voltages generated as graphene and a PMMA substrate are contacted with each other, in the triboelectric generator manufactured according to the elongation percentage of PDMS in FIGS. 17A and 17B. In detail, FIG. 18A illustrates a case in which an elongation percentage of the PDMS substrate is 0%, in other words, the PDMS substrate is not stretched, so that graphene is not formed in a wavy pattern. FIG. 18B illustrates a case in which the PDMS substrate is stretched by 10% and then restored so that graphene having the shape of a wavy pattern is formed. FIG. 18C illustrates a case in which the PDMS substrate is stretched by 20% and then restored, so that graphene having the shape of a wavy pattern is formed.

When the graphene has the shape of a wavy pattern, as illustrated in FIGS. 18B and 18C, friction electricity generated per unit area is increased, compared to the graphene of FIG. 18A.

As described above, the triboelectric generators according to the example embodiments include the energy generation layer that may generate electric energy through friction with other material having different charging characteristics, and the energy generation layer may include at a 1D nanomaterial and/or a 2D material. Also, when a flexible and stretchable substrate is used as the substrate, the electrode provided on the substrate, and the energy generation layer, may have flexibility and stretchability corresponding to, similar to or the same as the flexibility and stretchability of the substrate. Accordingly, the triboelectric generator manufactured by using the substrate having flexibility and stretchability may effectively generate electric energy due to external environment factors such as wind, sound, or movements of a person. Also, the amount of electric energy output may be increased by, for example, vertically stacking a plurality of triboelectric generators and serially connecting the triboelectric generators. The triboelectric generator may generate electric energy that can be used in, for example, portable electronic devices, clothes, bags, hats, gloves, or flags or by being attached on a body part of a person.

It should be understood that example embodiments described herein should be considered in a descriptive sense only and not for purposes of limitation. Descriptions of features within each example embodiment should typically be considered as available for other similar or same features in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A triboelectric generator comprising:
   first and second electrodes facing each other; and
   a first energy generation layer on the first electrode, the first energy generation layer being configured to generate electric energy by contact with at least one other material, the first energy generation layer including a two-dimensional (2D) material having a crystal structure of a 2D shape.

2. The triboelectric generator of claim 1, wherein the two-dimensional material comprises at least one of hexagonal-boron nitride (h-BN) and transition metal dichalcogenide (TMD).

3. The triboelectric generator of claim 2, wherein the TMD comprises one of Mo, W, Nb, V, Ta, Ti, Zr, Hf, Tc, Re, Cu, Ga, In, Sn, Ge, and Pb, and one of S, Se, and Te.

4. The triboelectric generator of claim 2, wherein the 2D material has a single layer or a multilayer structure.

5. The triboelectric generator of claim 2, wherein the 2D material has a thickness of about 0.3 nm to about 1000 nm.

6. The triboelectric generator of claim 1, wherein the 2D material is doped or undoped.

7. The triboelectric generator of claim 1, further comprising a spacer between the first electrode and the second electrode.

8. The triboelectric generator of claim 1, wherein the first energy layer generates electric energy by contact with the second electrode.

9. The triboelectric generator of claim 1, further comprising at least one of a first substrate on which the first electrode and the first energy generation layer are located and a second substrate on which the second electrode is located.

10. The triboelectric generator of claim 9, wherein the first energy generation layer is configured to generate electric energy by contact with the second electrode or the second substrate.

11. The triboelectric generator of claim 9, wherein at least one of the first and second substrates is stretchable.

12. The triboelectric generator of claim 11, wherein the at least one of the first and second substrates comprises at least one of polydimethylsiloxane (PDMS), polyimide (PI), Teflon, urethane, and nylon.

13. The triboelectric generator of claim 11, wherein the at least one of the first and second substrates has an elongation percentage of about 200% or lower.

14. The triboelectric generator of claim 11, wherein the at least one of the first and second substrates has a surface having a wavy shape.

15. The triboelectric generator of claim 14, wherein the first electrode and the first energy generation layer have a shape corresponding to a surface of the first substrate, and the second electrode has a shape corresponding to a surface of the second substrate.

16. The triboelectric generator of claim 11, wherein at least one of the first and second electrodes comprises at least one of carbon nanotube (CNT), graphene, Ag nanowire, metal, and metal mesh.

17. The triboelectric generator of claim 1, further comprising a second energy generation layer on the second electrode and configured to generate electric energy by contact with the first energy generation layer.

18. The triboelectric generator of claim 17, further comprising at least one of a first substrate on which the first electrode and the first energy generation layer are located and a second substrate on which the second electrode and the second energy generation layer are located.

19. The triboelectric generator of claim 18, wherein the at least one of the first and second substrates is stretchable.

20. A triboelectric generator comprising:
   first and second electrodes facing each other and having stretchability; and
   a first energy generation layer on the first electrode, the first energy generation layer being configured to generate electric energy by contact with at least one other material;
   wherein the first energy generation layer includes at least one of a one-dimensional (1D) material having a 1D shape of a nano size and a two-dimensional (2D) material having a crystal structure of a 2D shape.

21. The triboelectric generator of claim 20, wherein at least one of the 1D nanomaterial comprises carbon nanotube (CNT) and the 2D material comprises at least one of graphene, hexagonal-boron nitride (h-BN), and transition metal dichalcogenide (TMD).

22. The triboelectric generator of claim 20, wherein the first energy generation layer generates electric energy by contact with the second electrode.

23. The triboelectric generator of claim 20, further comprising at least one of a first substrate that is stretchable, on which the first electrode and the first energy generation layer are located, and a second substrate that is stretchable, on which the second electrode is located.

24. The triboelectric generator of claim 23, wherein the first energy generation layer is configured to generate electric energy by contact with the second electrode or the second substrate.

25. The triboelectric generator of claim 23, wherein at least one of the first and second substrates has a surface having a wavy shape.

26. The triboelectric generator of claim 25, wherein at least one of the first electrode and the first energy generation layer has a shape corresponding to a surface of the first substrate, and the second electrode has a shape corresponding to a surface of the second substrate.

27. The triboelectric generator of claim 20, further comprising a second energy generation layer on the second electrode and configured to generate electric energy by contact with the first energy generation layer.

28. The triboelectric generator of claim 27, further comprising at least one of a first substrate that is stretchable, on which the first electrode and the first energy generation layer are located, and a second substrate that is stretchable, on which the second electrode and the second energy generation layer are located.

29. A triboelectric generator comprising:
a plurality of energy generation units that are stacked,
wherein at least one of the energy generation units includes:
first and second electrodes facing each other; and
a first energy generation layer on the first electrode, the first energy generation layer being configured to generate electric energy by contact with at least one other material, the first energy generation layer including a two-dimensional (2D) material having a crystal structure of a 2D shape.

30. The triboelectric generator of claim 29, wherein the 2D material comprises at least one of graphene, hexagonal-boron nitride (h-BN) and transition metal dichalcogenide (TMD).

31. The triboelectric generator of claim 29, further comprising a second energy generation layer on the second electrode and configured to generate electric energy by contact with the first energy generation layer.

32. The triboelectric generator of claim 29, wherein the energy generation units are serially connected to one another.

33. A triboelectric generator comprising:
a plurality of energy generation units that are stacked,
wherein at least one of the energy generation units includes:
first and second electrodes facing each other and having stretchability; and
a first energy generation layer on the first electrode the first energy generation layer being configured to generate electric energy by contact with at least one other material;
wherein the first energy generation layer includes at least one of a one-dimensional (1D) material having a 1D shape of a nano size and a two-dimensional (2D) material having a crystal structure of a 2D shape.

34. The triboelectric generator of claim 33, wherein at least one of the 1D nanomaterial comprises carbon nanotube (CNT) and the 2D material comprises at least one of graphene, hexagonal-boron nitride (h-BN), and transition metal dichalcogenide (TMD).

35. The triboelectric generator of claim 33, further comprising a second energy generation layer on the second electrode and configured to generate electric energy by contact with the first energy generation layer.

36. The triboelectric generator of claim 1, wherein the first energy generation layer is directly on the first electrode.

37. The triboelectric generator of claim 29, wherein the first energy generation layer is directly on the first electrode.

38. The triboelectric generator of claim 1, wherein the first energy generation layer is a single phase layer.

39. The triboelectric generator of claim 29, wherein the first energy generation layer is a single phase layer.

* * * * *